(12) United States Patent
Parks et al.

(10) Patent No.: US 10,938,210 B2
(45) Date of Patent: Mar. 2, 2021

(54) POWER FLOW CONTROL SUBSYSTEM HAVING MULTIPLE CONFIGURATIONS

(71) Applicant: Smart Wires Inc., Union City, CA (US)

(72) Inventors: John Parks, Kennesaw, GA (US); Bryce Puchta, Kalispell, MT (US); Ali Farahani, Yorba Linda, CA (US); Ted Bloch-Rubin, Ann Arbor, MI (US); Mark Sanders, Kalispell, MT (US); Will Schmautz, Kalispell, MT (US); Casey Heier, Oakland, CA (US)

(73) Assignee: Smart Wires Inc., Union City, CA (US)

(*) Notice: Subject to any disclaimer, the term of this patent is extended or adjusted under 35 U.S.C. 154(b) by 0 days.

(21) Appl. No.: 16/590,088

(22) Filed: Oct. 1, 2019

(65) Prior Publication Data

US 2020/0251899 A1 Aug. 6, 2020

Related U.S. Application Data

(60) Provisional application No. 62/799,630, filed on Jan. 31, 2019.

(51) Int. Cl.
*H02J 3/06* (2006.01)
*H02J 3/18* (2006.01)
*H02J 13/00* (2006.01)

(52) U.S. Cl.
CPC ............ *H02J 3/06* (2013.01); *H02J 3/1835* (2013.01); *H02J 13/0006* (2013.01)

(58) Field of Classification Search
CPC ........ H02J 3/06; H02J 3/1835; H02J 13/0006; H02J 3/18; H02J 13/00
See application file for complete search history.

(56) References Cited

U.S. PATENT DOCUMENTS

| | | | |
|---|---|---|---|
| 4,272,740 | A | 6/1981 | MacMaster et al. |
| 4,282,491 | A | 8/1981 | MacMaster et al. |

(Continued)

FOREIGN PATENT DOCUMENTS

| | | |
|---|---|---|
| CN | 108990375 A | 12/2018 |
| KR | 10-2018-0121332 A | 11/2018 |
| WO | 2010/118772 A1 | 10/2010 |

OTHER PUBLICATIONS

Extended Search Report dated May 25, 2020; European Patent Application No. 20154627.2; 10 pages total.

(Continued)

*Primary Examiner* — Robert L Deberadinis
(74) *Attorney, Agent, or Firm* — Womble Bond Dickinson (US) LLP

(57) ABSTRACT

A power flow control subsystem having multiple configurations is described. The subsystem is three-way configurable: as a transportable configuration, as a deployable configuration, and as a transmission line configuration. The transportable configuration includes a collection of impedance injection modules and at least one bypass module carried on a wheeled vehicle such as a trailer. The deployable configuration is an assembly of the collection of impedance injection modules and at least one bypass module, operable to perform power flow operations. The transmission line configuration includes connection of a deployable configuration to a phase of a high voltage transmission line for performing power flow control. The deployable configuration may be open or closed frame. The deployable configurations may be mounted on one or more wheeled vehicles in a mobile subsystem, or semi-permanently mounted at a ground site.

20 Claims, 10 Drawing Sheets

(56) References Cited

U.S. PATENT DOCUMENTS

| | | | |
|---|---|---|---|
| 4,282,492 | A | 8/1981 | MacMaster et al. |
| 4,283,685 | A | 8/1981 | MacMaster et al. |
| 4,823,640 | A | 4/1989 | Donnelly |
| 7,398,168 | B2 | 7/2008 | Lapinski et al. |
| 8,512,187 | B2 | 8/2013 | Puiu et al. |
| 8,651,989 | B2 | 2/2014 | Puiu et al. |
| 9,399,466 | B2 | 7/2016 | Cueppers |
| 9,915,198 | B2 | 3/2018 | Dippold et al. |
| 2007/0052493 | A1 | 3/2007 | Lapinski et al. |
| 2013/0225349 | A1 | 8/2013 | Puiu et al. |
| 2015/0233287 | A1 | 8/2015 | Dippold et al. |
| 2016/0101781 | A1 | 4/2016 | Cueppers |
| 2017/0033553 | A1 | 2/2017 | Wimmer |
| 2018/0269682 | A1* | 9/2018 | Specht .............. H05K 7/20236 |
| 2018/0316163 | A1 | 11/2018 | Jung |

OTHER PUBLICATIONS

McVey, Mark et al., "Mobile STATCOM Multi Tool for Transmission Operations, Construction and Rapid Restoration", 2018 IEEE/PES Transmission and Distribution Conference and Exposition (T&D), Apr. 16, 2018, 5 pages total.

\* cited by examiner

POWER FLOW CONTROL SUBSYSTEM HAVING MULTIPLE CONFIGURATIONS

CROSS REFERENCE TO RELATED APPLICATIONS

This application claims the benefit of U.S. Provisional Application No. 62/799,630 filed on Jan. 31, 2019, the disclosure of which is incorporated herein by reference.

TECHNICAL FIELD

This invention relates to a power flow control subsystem, and more particularly to a power flow control subsystem having a transportable configuration, a deployable configuration, and a transmission line configuration.

BACKGROUND

Power flow control systems require a complex collection of modules and components to be delivered, configured and tested at an installation site.

To reduce installation time and make the installment process more efficient, there is a need in the art for a multi-configurable subsystem, optimized for its transportation, deployment, and power line implementations.

DETAILED DESCRIPTION

A power flow control subsystem having multiple configurations is described. The subsystem is three-way configurable: as a transportable configuration, as a deployable configuration, and as a transmission line configuration. The transportable configuration includes a collection of impedance injection modules and at least one bypass module carried on a wheeled vehicle such as a trailer. The deployable configuration is an assembly of the collection of impedance injection modules and at least one bypass module, operable to perform power flow operations. The transmission line configuration includes connection of a deployable configuration to a phase of a high voltage transmission line for performing power flow control. The deployable configuration may be open or closed frame. The deployable configurations may be mounted on one or more wheeled vehicles in a mobile subsystem, or semi-permanently mounted at a ground site.

During normal operation each impedance injection module is series connected into a power transmission line. By injecting a synthesized waveform onto the line, the impedance of the line may be adjusted to provide more efficient routing of current among the available transmission lines in a power distribution system, thus implementing power flow control. The synthesized waveform may be used to inject a capacitive or an inductive impedance onto the line, effective for power flow control, while not substantially contributing to losses in the line.

Each impedance injection module includes voltage and current sensors that provide early warning of a fault condition. Typically, the fault condition is detected by detecting an imbalance in current, from one phase to another. When this occurs, the bypass switch is connected in bypass mode to bypass associated impedance injection modules and carry the fault current. This condition of the power flow control system may be described as "monitor mode".

It may be convenient to define an exemplary power flow control subsystem comprising five impedance injection modules and one bypass switch. This exemplary subsystem can be transported and conveniently configured as a deployable subsystem. Each subsystem may be used to inject 5 mega volt amps reactive (MVAR) for example, and multiples of such power flow control subsystems may be connected in series to effect higher levels of impedance injection.

Figure 1:
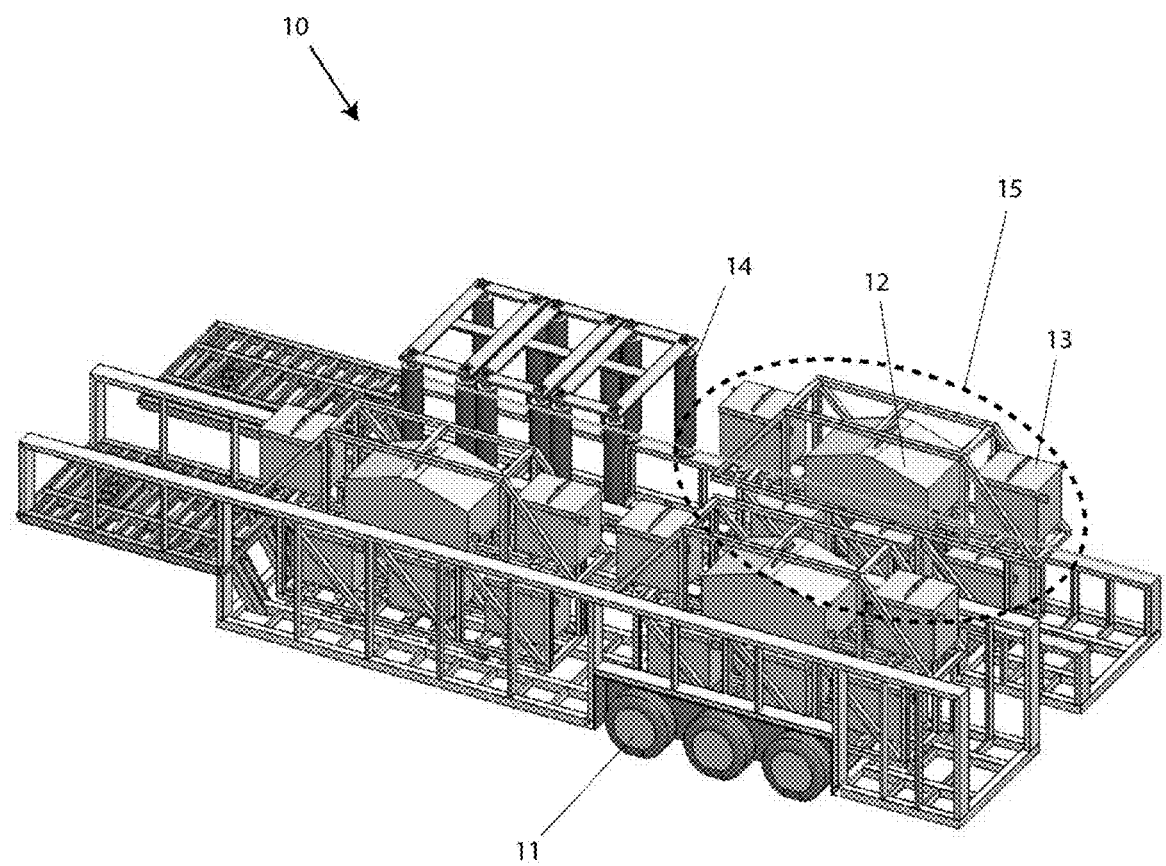
FIG. 1 is a perspective view of a wheeled trailer carrying power flow control equipment to an installation site.

FIG. 1 depicts a wheeled vehicle 10 carrying equipment for installation of a power flow control system on a high voltage transmission line. Wheels 11 of the wheeled vehicle are shown. Wheeled vehicle 10 may be a trailer, or any other wheeled vehicle capable of carrying the equipment. A bypass switch module 12 and an impedance injection module 13 are shown. In one embodiment, impedance injection module 13 may be a Transformerless Static Synchronous Series Converter (TSSSC). An insulation post 14 is also shown. A collection of power flow control equipment 15 is shown, including an exemplary set of 5 impedance injection modules and one bypass switch module, configured as the transportable configuration of a power flow control subsystem of the present disclosure. The power flow control subsystem may have multiple configurations to be described herein. It will be further described that the power flow control subsystem may include a set of insulation posts 14, the set containing 4 posts in an exemplary configuration.

Figure 2:
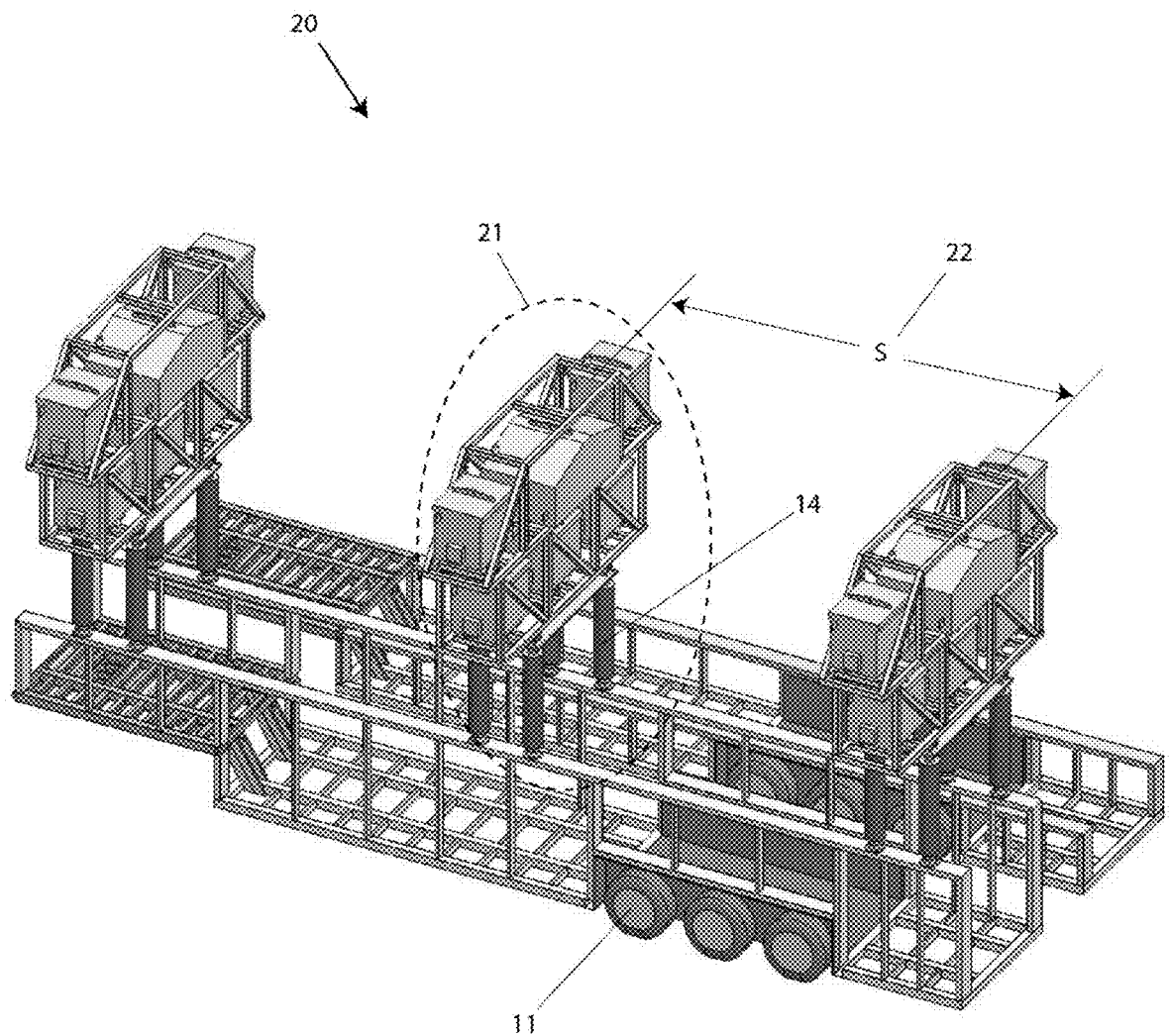
FIG. 2 is a perspective view of a collection of standardized power flow control subsystems configured for deployment while mounted on a wheeled vehicle.

FIG. 2 shows a wheeled vehicle 20 to which an exemplary set of three power flow control subsystems is attached. The subsystems 21 are in their deployable configuration, shown mounted on a set of insulating posts 14. The deployable configuration is operable to perform power flow operations when suitably connected to a transmission line for example. A separation distance 22 (referred to as "S" in FIG. 2) is shown between subsystems; this distance is sufficient to prevent unwanted interaction between the subsystems, including unwanted arcing.

Figure 3:
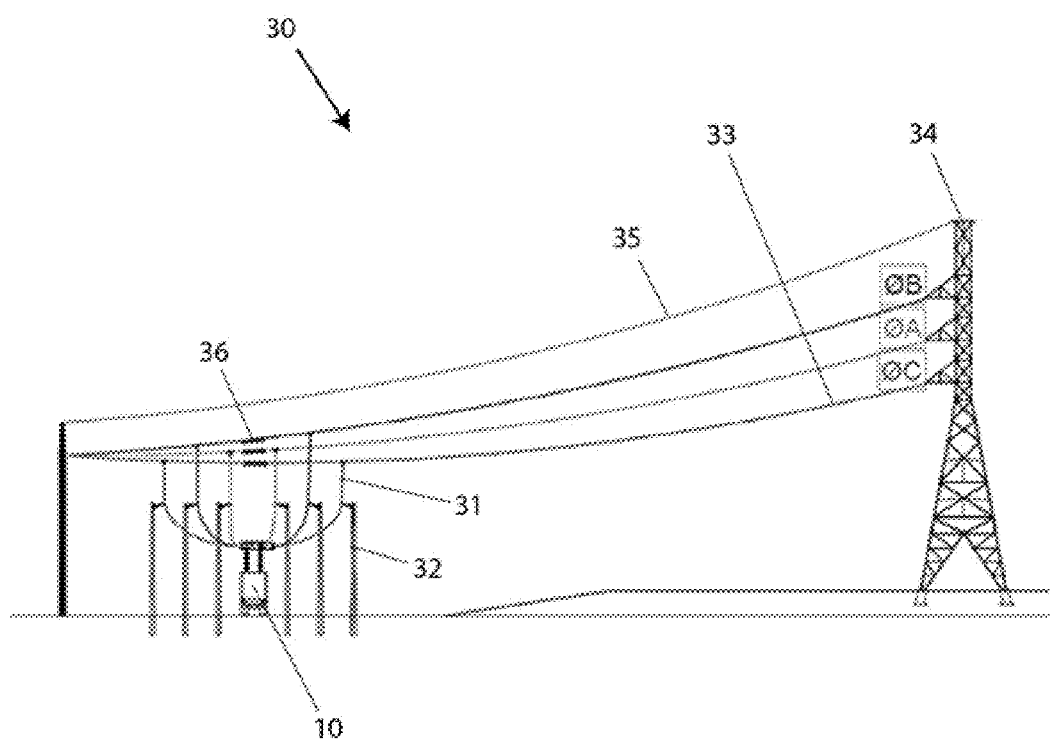
FIG. 3 is a cross-sectional view of a power flow control system that includes power flow control subsystems in their transmission line configuration.

FIG. 3 illustrates a transmission line configuration of a power flow control system 30 of the present disclosure. Wheeled vehicle 10 is shown, on which a set of power flow control subsystems is carried. Each subsystem is in its deployable configuration. A jumper cable connection 31 is shown, carried by a pole 32, wherein the connection from the subsystem is made to a phase 33 of a high voltage transmission line, the connection to phase 33 connected through an insulator (not shown) to a transmission line tower 34. A shield cable 35 may also be employed as shown. In-line transmission separators 36 are also shown. It can be clearly understood that this exemplary configuration of system 30 could be adapted to use the power flow control subsystems connected to a semi-permanent ground pad instead of to a wheeled vehicle.

Figure 4:
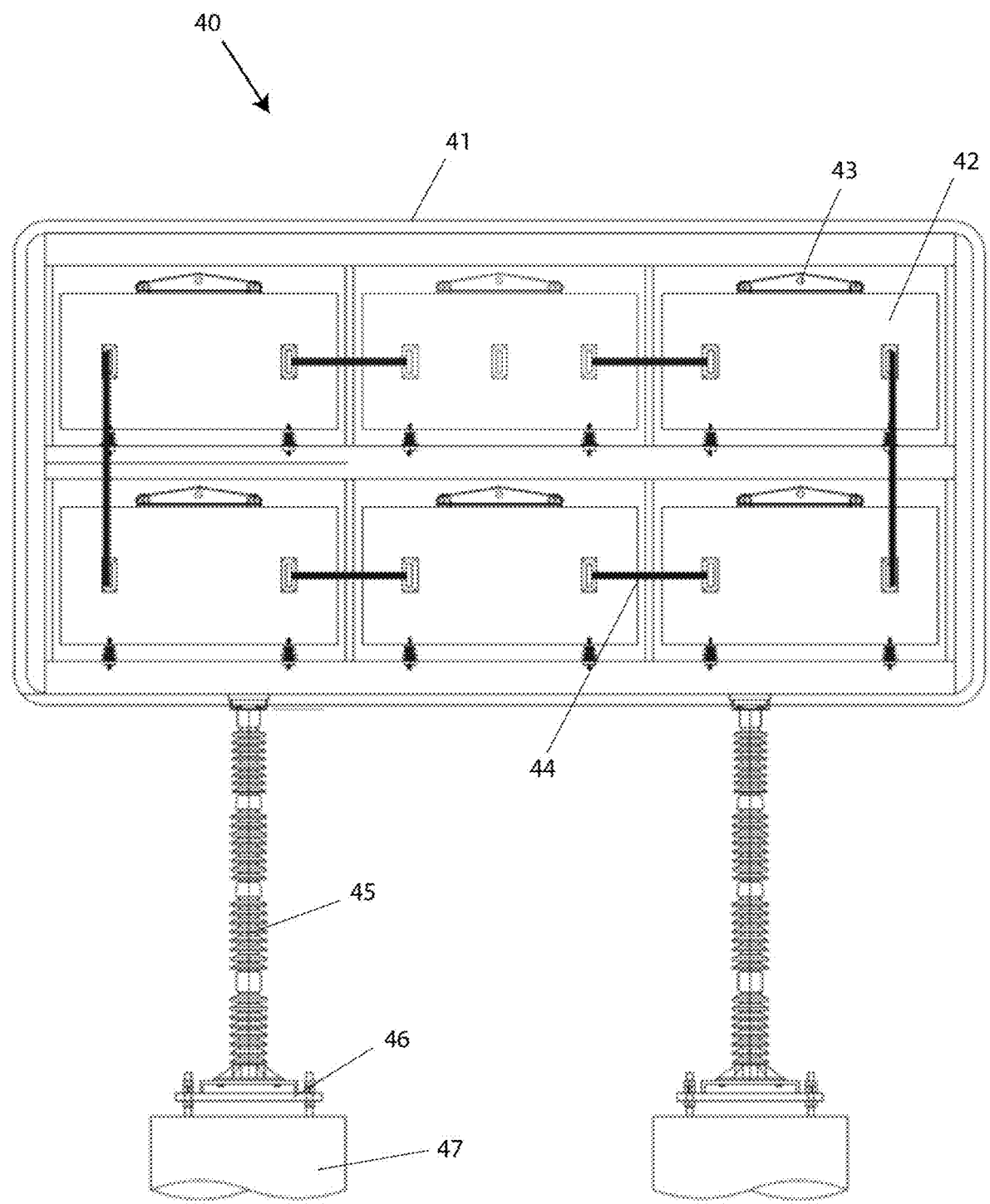
FIG. 4 is a front cross-sectional view of a power flow control subsystem in an open frame configuration, mounted on semi-permanent footings.

FIG. 4 shows a power flow control subsystem 40 in an open frame configuration of the present disclosure, comprising a corona ring 41. An exemplary set of six similarly sized modules 42 is shown, each one equipped with a lifting attachment 43, suitable for deployment using a crane for example. Any lifting device may be used, including hydraulic lifters and jackscrew devices. At the bottom of power flow control subsystem 40 access tubes (not shown) for lifting with a fork lift may be provided. Straps 44 between modules 42 are also shown; they are electrical bus-bars that transfer voltage and current. The open frame configuration is carried on insulating posts 45, with an interface assembly 46 shown for connection to a semi-permanent footing such as 47. The semi-permanent footing 47 may be implemented as a concrete pad for example; other types of footings and interface assemblies may also be used. An advantage of the open frame configuration of subsystem 40 is that it is easy to maintain, with ready access to the internal modules.

Figure 5:
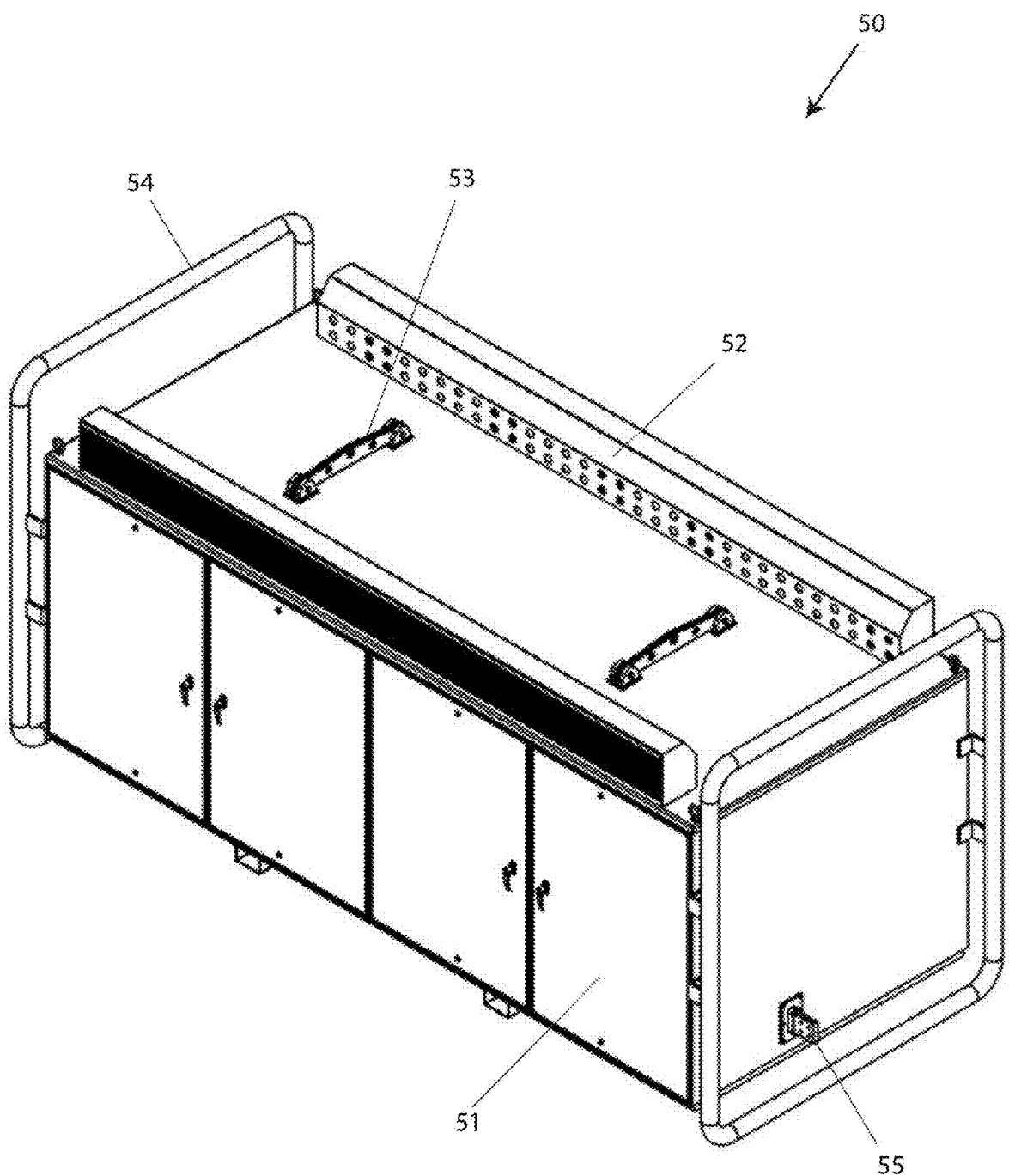
FIG. 5 is a perspective view of a closed frame configuration of a power flow control subsystem.

FIG. 5 depicts a power flow control subsystem 50 in a closed frame configuration of the present disclosure, in which a series of doors 51 open to access internal modules (such as a bypass switch module and one or more impedance injection modules) in their deployment configuration. Compared with the open frame configuration of FIG. 4, closed frame configuration 50 may be more densely constructed, smaller size, lower weight, and less prone to damage during transport and installation. A row of cooling fans 52 may be provided as shown. Carrying handle 53 is shown, together with corona rings 54. The corona rings 54 assist in reducing arcing to adjacent equipment and to the ground. A connector 55 (e.g., national electrical manufacturers association (NEMA) connector) is shown, providing a standard connection method to a phase of a high voltage transmission line supported by a tower for example. This connection may also be made in a substation or any other suitable location, with no tower involved.

Figure 6:
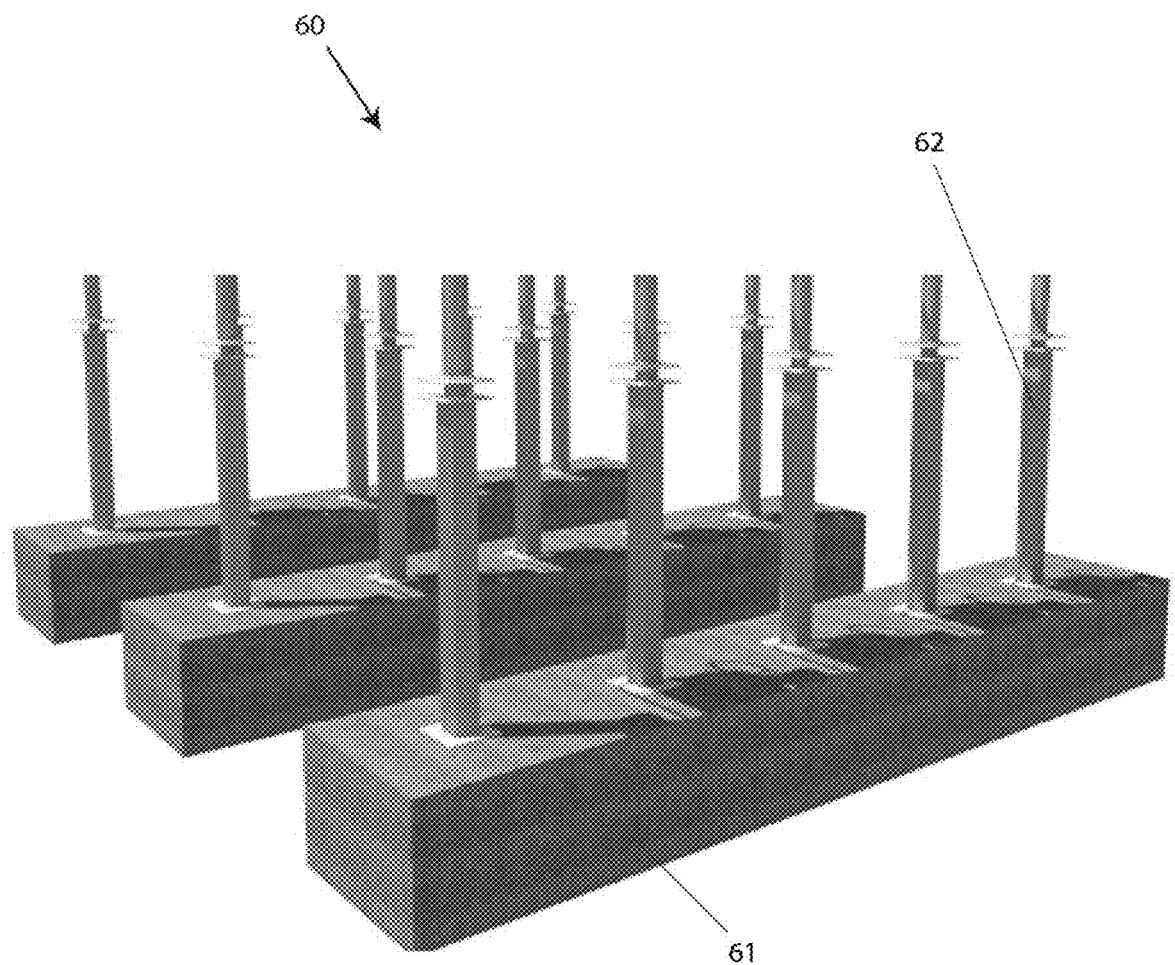
FIG. 6 is a perspective view of insulating posts for mounting multiple power flow control subsystems on semi-permanent footings.

FIG. 6 depicts a set of ground pads 60 at an installation site for a power flow control system. The installation site includes semi-permanent footings 61, provided for a semi-permanent installation of power flow control subsystems for example. The installation site may include a sufficient number of isolation/insulation posts 62, for installation of several power flow control subsystems. Posts 62 may comprise a steel portion for elevating the energized elements to a minimum height above the ground, plus an insulating portion at the top end of each post.

An exemplary power flow control subsystem includes five impedance injection modules and one bypass switch module in a power flow control subsystem and is operable to perform power flow control of at least 5 MVAR (mega volt amps reactive) (e.g., up to 15 MVAR).

Figure 7:
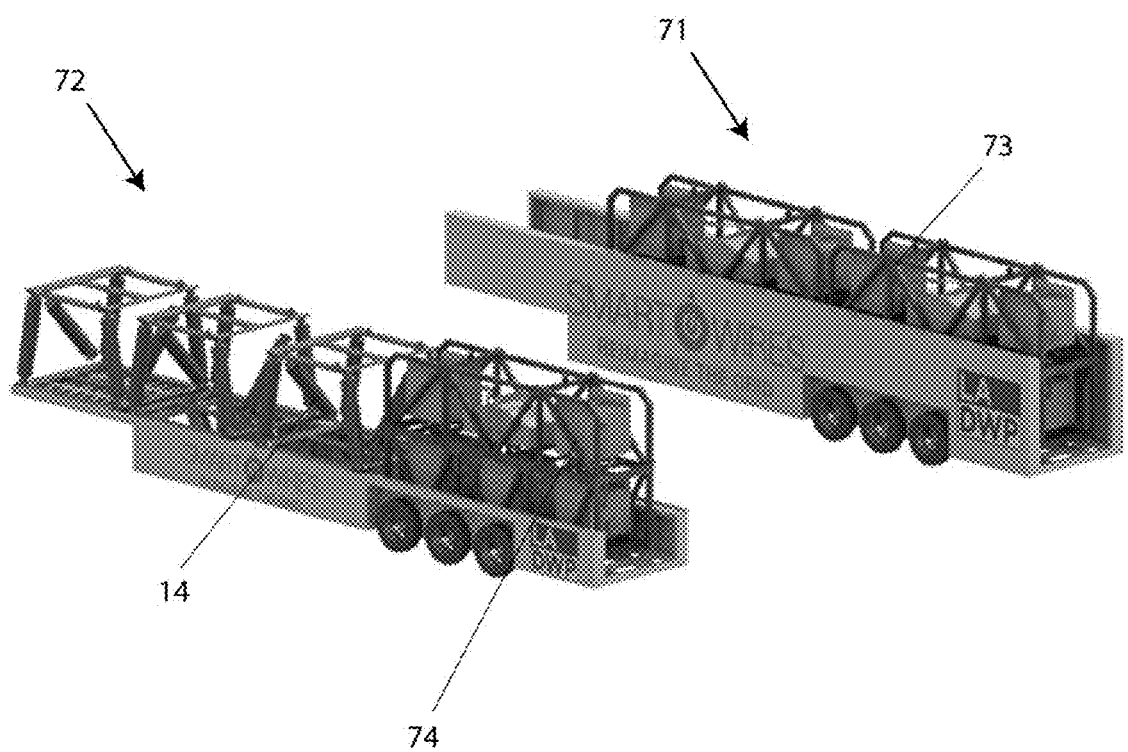
FIG. 7 is a perspective view of a pair of wheeled trailers carrying power flow control equipment.

FIG. 7 illustrates a pair of companion wheeled vehicles 71 and 72 for transporting a power flow control system. Wheeled vehicles may be transported by road with no additional carrier; they may also be carried as freight by rail, by ship or by air as examples, with road travel to be used near their destination points. In FIG. 7, wheeled vehicle 72 may be called the "guest trailer" or "guest vehicle"; it carries power flow control equipment such as impedance injection module 74 and insulating post 14 and may not be well suited to deployment configurations of power flow control subsystems. Wheeled vehicle 71 may be called the "host trailer" or "host vehicle" because the subsystems may be mounted in their deployment configurations, ready for operation in a power flow control system.

Figure 8:
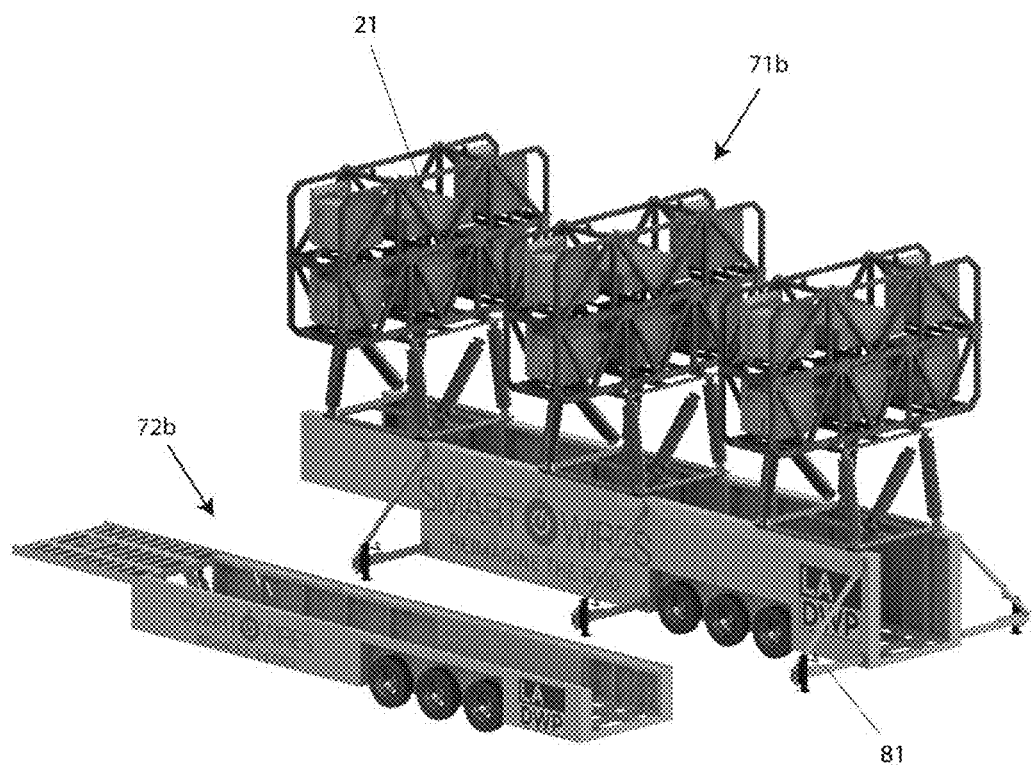
FIG. 8 is a perspective view of power flow control subsystems deployed on a host trailer, with a companion guest trailer nearby.

FIG. 8 shows a host trailer 71b having three power flow control subsystems 21 mounted in their deployment configuration, ready for power flow operations. Guest trailer 72b is empty. Host trailer 71b is shown with collapsible outriggers 81, to stabilize the mobile installation. Load levelers (not shown) may also be provided.

Figure 9:
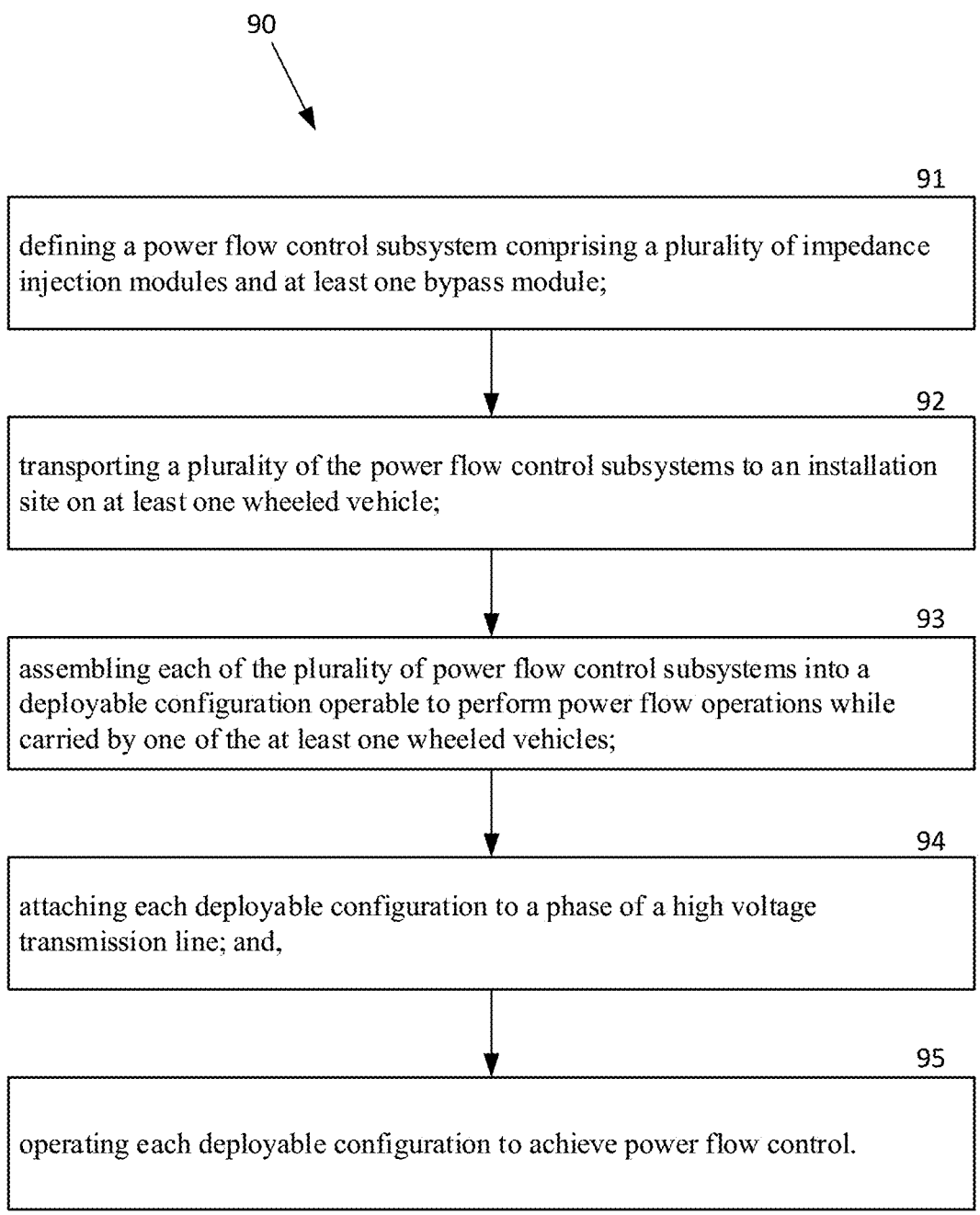
FIG. 9 is a flow chart of an exemplary method for deploying power flow control subsystems on a wheeled vehicle, including connection to and operation in a high voltage transmission line.

FIG. 9 depicts a flow chart of a method 90 for an exemplary method for installing and operating a power flow control system of the present disclosure. Method 90 includes the steps of:

defining a power flow control subsystem comprising a plurality of impedance injection modules and at least one bypass module, at step 91, transporting a plurality of the power flow control subsystems to an installation site on at least one vehicle, at step 92, assembling each of the plurality of power flow control subsystems into a deployable configuration operable to perform power flow operations while carried by one of the at least one vehicles, at step 93, attaching each deployable configuration to a phase of a high voltage transmission line, at step 94, and, operating each deployable configuration to achieve power flow control, at step 95.

Figure 10:
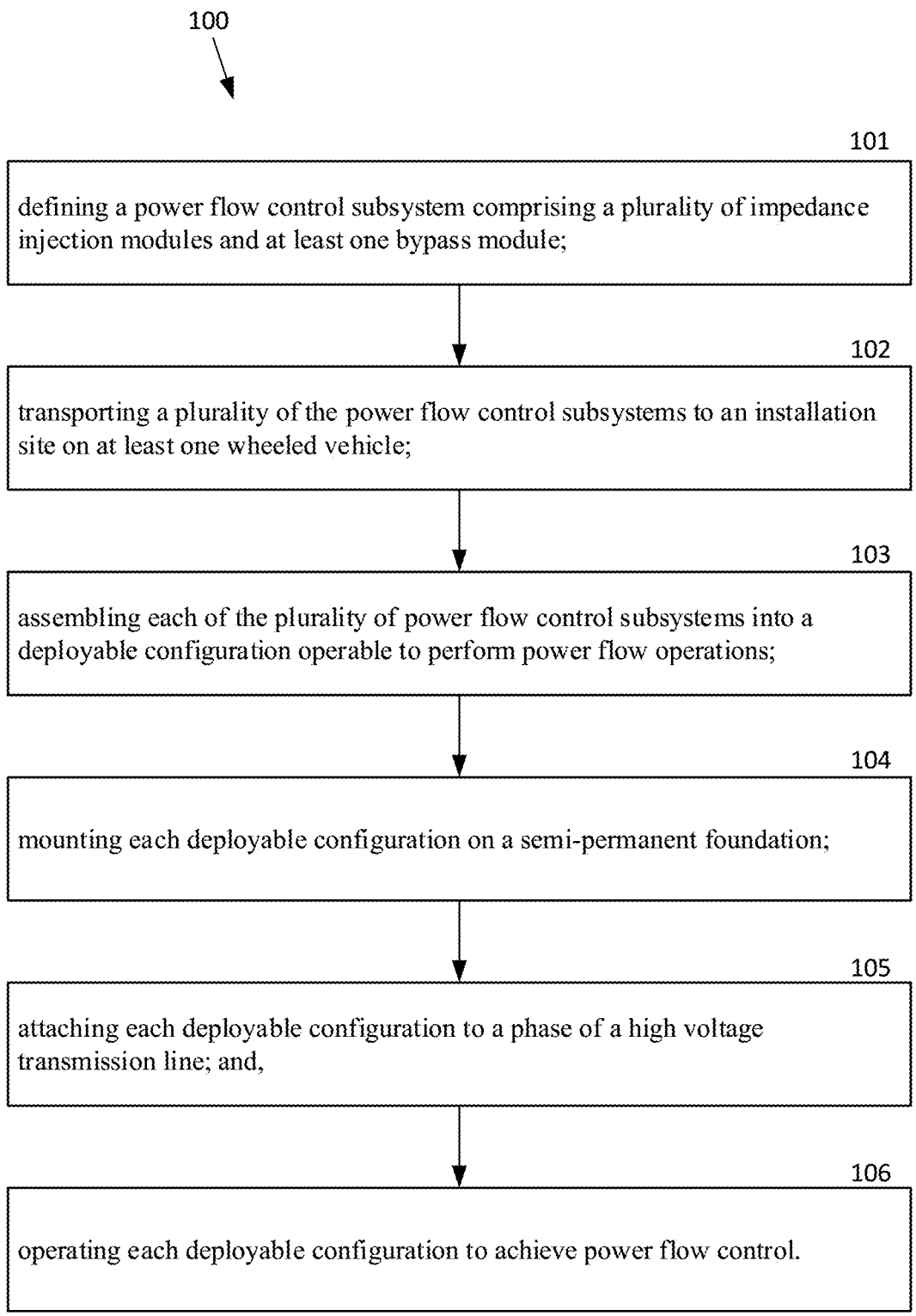
FIG. 10 is a flow chart of an exemplary method for deploying power flow control subsystems at a ground installation site, including connection to and operation in a high voltage transmission line.

FIG. 10 depicts a flow chart of an alternative exemplary method 100 for installing and operating a power flow control system of the present disclosure. Method 100 includes the steps of:

defining a power flow control subsystem comprising a plurality of impedance injection modules and at least one bypass module, at step 101, transporting a plurality of the power flow control subsystems to an installation site on at least one vehicle, at step 102, assembling each of the plurality of power flow control subsystems into a deployable configuration operable to perform power flow operations, at step 103, mounting each deployable configuration on a semi-permanent (or permanent) foundation, at step 104, attaching each deployable configuration to a phase of a high voltage transmission line, at step 105, and, operating each deployable configuration to achieve power flow control, at step 106.

Variations of the method 90 and the method 100, using various embodiments of the power flow control system and the subsystem, are readily devised in accordance with the teachings herein.

What is claimed is:

1. A subsystem of a power flow control system, the subsystem comprising:
   a plurality of impedance injection modules; and
   at least one bypass module;
   wherein the subsystem is configurable in three configurations:

a transportable configuration wherein the plurality of impedance injection modules and the at least one bypass module are attached to and carried by a wheeled vehicle;

a deployable configuration wherein the plurality of impedance injection modules and the at least one bypass module are mechanically and electrically connected to form a single unit operable to perform power flow operations; and a transmission line configuration wherein the deployable configuration is connected to a high voltage transmission line for executing a power flow control operation.

2. The subsystem of claim 1 wherein:

the deployable configuration comprises an open frame and the plurality of impedance injection modules and the at least one bypass module are attached to the open frame.

3. The subsystem of claim 1 wherein the deployable configuration comprises a closed frame and the plurality of impedance injection modules and the at least one bypass module are contained within the closed frame.

4. The subsystem of claim 1 wherein power flow control operation is executable while the deployable configuration is carried by the wheeled vehicle.

5. The subsystem of claim 1 wherein power flow control operation is executable while the deployable configuration is attached to a semi-permanent foundation.

6. The subsystem of claim 1 wherein each of the plurality of impedance injection modules is a Transformerless Static Synchronous Series Converter (TSSSC).

7. The subsystem of claim 1, wherein:

the plurality of impedance injection modules comprises five impedance injection modules;

the at least one bypass module comprises one bypass module; and the subsystem is operable to perform power flow control of at least 5 MVAR (mega volt amps reactive).

8. A method for installing and operating a power flow control system comprising:

defining a power flow control subsystem comprising a plurality of impedance injection modules and at least one bypass module;

transporting a plurality of such power flow control subsystems to an installation site on an at least one vehicle;

assembling each of the plurality of power flow control subsystems into a deployable configuration operable to perform power flow operations while carried by the at least one vehicle;

attaching each deployable configuration to a phase of a high voltage transmission line; and, operating each deployable configuration to achieve power flow control.

9. The method of claim 8 wherein the at least one vehicle comprises:

a host vehicle on which impedance injection modules and bypass modules are transported and on which a plurality of such deployable configurations may be deployed; and a guest vehicle for transporting further impedance injection modules, further bypass modules and further installation equipment.

10. The method of claim 8 wherein the deployable configuration comprises an open frame and the plurality of impedance injection modules and the at least one bypass module are attached to the open frame.

11. The method of claim 8 wherein the deployable configuration comprises a closed frame and the plurality of impedance injection modules and the at least one bypass module are contained within the closed frame.

12. The method of claim 8 further comprising executing a power flow control operation while the deployable configuration is carried by the at least one vehicle.

13. The method of claim 8 further comprising executing a power flow control operation while the deployable configuration is attached to a semi-permanent foundation.

14. The method of claim 8, wherein:

the plurality of impedance injection modules comprises five impedance injection modules, each comprising a Transformerless Static Synchronous Series Converter (TSSSC);

the at least one bypass module comprises one bypass module; and the method further comprises performing power flow control of at least 5 MVAR (mega volt amps reactive).

15. A method for installing and operating a power flow control system comprising:

defining a power flow control subsystem comprising a plurality of impedance injection modules and at least one bypass module;

transporting a plurality of such power flow control subsystems to an installation site on an at least one vehicle;

assembling each of the plurality of power flow control subsystems into a deployable configuration operable to perform power flow operations;

mounting each deployable configuration on a semi-permanent foundation;

attaching each deployable configuration to a phase of a high voltage transmission line; and, operating each deployable configuration to achieve power flow control.

16. The method of claim 15 wherein the at least one vehicle comprises:

a host vehicle on which impedance injection modules and bypass modules are transported and on which a plurality of such deployable configurations may be deployed; and a guest vehicle for transporting further impedance injection modules, further bypass modules and further installation equipment.

17. The method of claim 15 wherein the deployable configuration comprises an open frame and the plurality of impedance injection modules and the at least one bypass module are attached to the open frame.

18. The method of claim 15 wherein the deployable configuration comprises a closed frame and the plurality of impedance injection modules and the at least one bypass module are contained within the closed frame.

19. The method of claim 15 wherein each of the plurality of impedance injection modules is a Transformerless Static Synchronous Series Converter (TSSSC).

20. The method of claim 15, wherein:

the plurality of impedance injection modules comprises five impedance injection modules;

the at least one bypass module comprises one bypass module; and the method further comprises operating the power flow control subsystem to perform power flow control of at least 5 MVAR (mega volt amps reactive).

\* \* \* \* \*